J. E. HALL.
Coffee Pot.
No. 13,595. Patented Sept. 25, 1855.
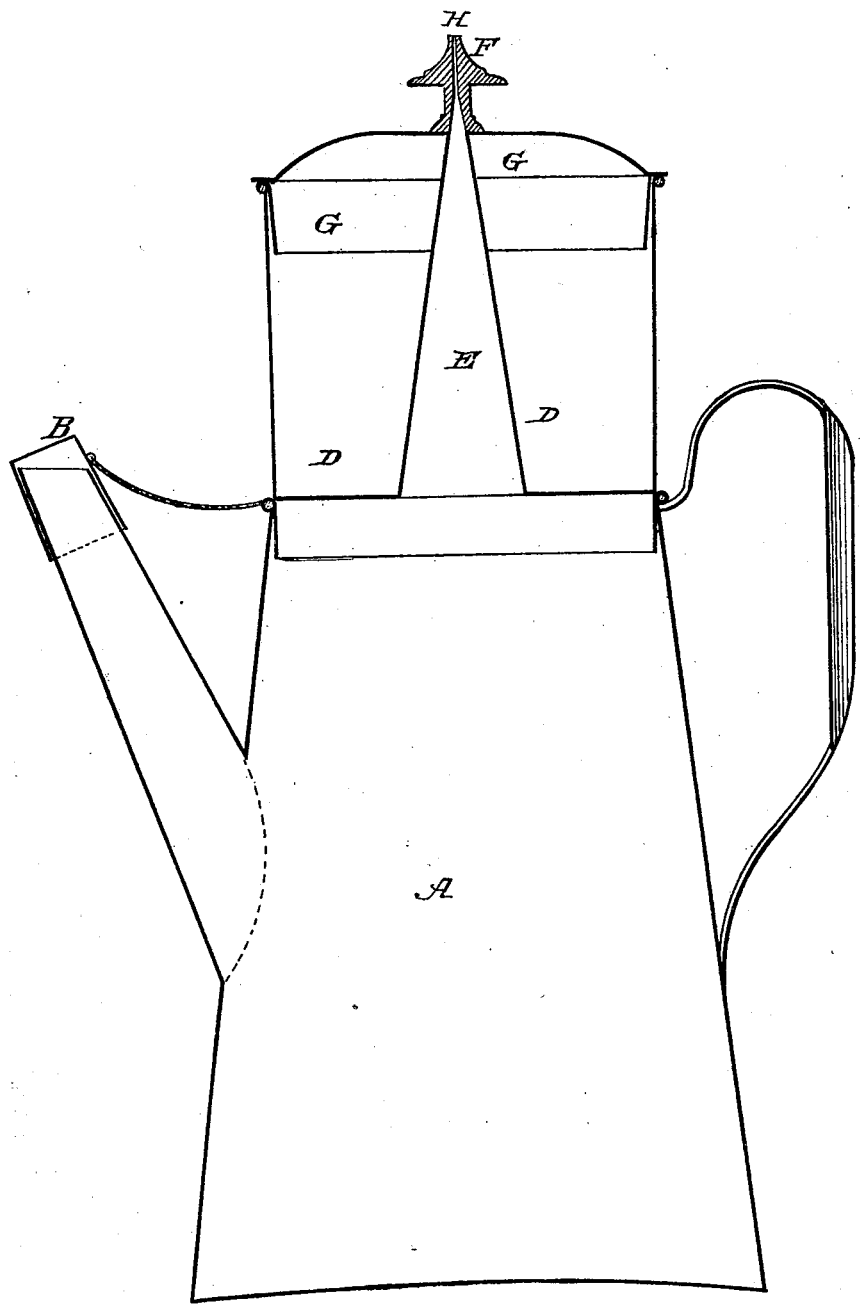

UNITED STATES PATENT OFFICE.

JOSHUA E. HALL, OF CLEVELAND, OHIO.

COFFEE-POT.

Specification of Letters Patent No. 13,595, dated September 25, 1855.

*To all whom it may concern:*

Be it known that I, JOSHUA E. HALL, of Cleveland, in the county of Cuyahoga and State of Ohio, have invented a new and useful Improvement in Coffee-Pots; and I do hereby declare that the following is a full and exact description thereof, reference being had to the accompanying drawings, which represent a vertical section of my improved coffee-pot.

A, in the drawing, represents the body of the coffee pot, which is of the ordinary form; B, a cap placed over the spout when necessary to keep the steam from escaping, and which is secured to the coffee pot by a chain, by which it hangs when not in place over the spout; D, D, the cold water reservoir, which is placed in the top of the coffee pot, and which condenses the steam which rises from the coffee while boiling; E, a conical tube which rises from the center of the lower floor of the reservoir to a short distance above its rim. This tube, being encircled by the water in the reservoir, condenses the steam which rises into it, and thus greatly enlarges the condensing surface presented to the steam. The knob F, of the lid G, is hollow, and receives the apex of the conical tube E, serving as a continuation of that tube, the substances escaping from which are discharged through the aperture H.

The coffee being placed in the coffee pot, and the water for boiling poured upon it, the cap B, is placed over the spout, and the reservoir D D placed in the top, and filled with cold water and covered with the lid. Then as fast as the steam is generated, it ascends to the floor of the reservoir, and up into the tube E, and is condensed by the coldness of those surfaces, and dropped back into the coffee below. The accidental and foreign gases, that may have been absorbed by the coffee before boiling, find vent at the aperture H.

It is well known, that when boiling coffee in the ordinary coffee pot, the odor or aroma, is dissipated with the steam, and fills the room, and if the coffee is boiled sufficiently to extract its essential qualities, the aroma, which is the most desirable part, is almost entirely lost. In my improved coffee pot, all the steam being condensed and restored to the coffee, all the aroma is preserved, and the coffee may be boiled until all its desirable qualities are extracted. The effect of the pressure of steam upon the boiling coffee is to greatly increase its temperature, thus extracting more perfectly the strength of the coffee, than could be done in the ordinary coffee pot, even if the boiling were continued until all the volatile qualities were dissipated. Thus, in the use of this coffee pot, a smaller quantity of coffee is required to render the decoction of the desired strength, and at the same time, the resulting preparation is more agreeably flavored, in consequence of having lost none of its aroma. Should the coffee be allowed to continue boiling until the water in the reservoir becomes heated, and the steam has attained a high pressure, it will escape through the aperture H, which acts as a safety valve, thus avoiding the possibility of an explosion, which often occurs in other condensing coffee pots. When the coffee pot is placed upon the table, the condensed drops falling back into the liquid below, tend to settle or precipitate the coffee. The coffee is retained at the desired temperature longer in this, than in the ordinary coffee pot.

The advantages which my improved coffee pot possesses, over others, are, that by means of the conical tube E, a larger condensing surface is obtained, and that by its means in combination with the hollow knob, and its aperture, the steam finds a ready and certain vent.

What I claim as my invention, and desire to secure by Letters Patent, is—

The conical tube E, with the hub F, and aperture H, which serve as its continuation, this I claim in combination with the reservoir D D, for the purpose set forth.

JOSHUA E. HALL.

Witnesses:
  I. T. PHIGUT,
  W. H. BURRIDGE.